Patented June 11, 1940

2,203,905

UNITED STATES PATENT OFFICE 2,203,905

PIGMENT

Joseph C. Heckman, Pittsburgh, Pa.

No Drawing. Application June 21, 1937, Serial No. 149,435. Renewed October 21, 1939

1 Claim. (Cl. 134—59)

My invention relates to pigments such as are employed in coloring or tinting, or as polishing rouges etc.

The invention has for its object the making of pigment products of high quality and desired shades which can be produced largely from waste materials which contain high percentages of iron.

In its preferred embodiment, my invention includes the use of a sulphate of iron, finely divided iron oxide such as iron sludge or blast furnace flue dust, and carbon, all mixed together and calcined. Various detailed aspects of the invention are hereinafter set forth.

The sulphate of iron preferably will be in the form of sludge such as settles or is precipitated from the water drainage inside of and emitted from coal mines, and contains a considerable percentage (26% to 31%) of sulphur. This is commonly called coal mine sulphur mud. Other forms of sulphate of iron such as copperas may be employed instead of the coal-mine sulphate of iron.

The finely divided iron oxide may be a waste product such as iron sludge, blast furnace flue dust, or other iron residues, or may be hydrated oxide of iron or iron ore.

The carbon constituent may include finely divided wood, such as sawdust, wood flour and wood wool; bituminous or anthracite coal; coal pyrites; coke; charcoal; bone black; or similar volatile material.

The sulphate of iron and the other ferrous or iron-containing materials can be mixed together, the sulphate of iron constituting 10% to 90%, by weight, of the mix and the remainder the other finely divided iron. They may each constitute 50% of the ferrous mixture. The ferrous compound thus obtained is mixed with the carbon in various proportions, for example:

Carbon_____ .5% to 30%, by weight
Ferrous material_____ 70% to 99.5%

The carbon and ferrous material will be finely divided and then calcined for a period of two or three hours at from 1200° F. to 1500° F.

The ferrous material alone when calcined will be of a good red color. The carbon content when calcined with the ferrous material greatly enriches the color, producing a variety of shades which are not possible with ferrous material alone, and the percentage of carbon will be varied in accordance with the shade desired. Also, the firing at the lower temperatures for a longer period of time produces a brighter color than does a shorter firing period at higher temperatures.

Instead of carbon, or in addition to carbon, spent oxide of iron from gas manufacturing plants, may be included with the ferrous material previous to firing, in percentages of perhaps from .5% to 12% and upward. The sulphur produces a different shade in the pigment than does the carbon. Where the carbon in small quantities will give a yellowish tone to the red pigment, the sulphur will produce more of a blue tone therein.

The spent oxide of iron above referred to is produced in large quantities as a waste product in the manufacturing of artificial gas. A typical analysis of this product is as follows:

| | Per cent |
|---|---|
| Ferric oxide | 26.71 |
| Sulphur | 48.56 |
| Cyanides | 4.64 |
| Tar | 4.11 |

The cyanides referred to in said analysis usually are in the form of ferro cyanide potassium which sometimes turns into Prussian blue.

The value of this waste product in the making of pigments is to a large degree attributable to the presence therein of the said cyanides, because they greatly enhance the brilliancy of color in ferrous sulphates and other forms of oxides of iron. Furthermore, a variety of brilliant red shades may be obtained by the use of the material, by varying the percentage of spent oxides which are employed in making the pigment.

Pyrites cinder, which is an iron compound, can be mixed with the dilute solution of sulphuric acid, or another mineral acid, the carbon or sulphur compounds added, then dried and calcined.

Ordinarily, the pyrites cinder will be obtained from iron pyrites, after the sulphur has been removed by burning.

I claim as my invention:

The method of producing an iron oxide pigment material which comprises making a mixture containing 88% to 99.5% ferrous sulphate and .5% to 12% spent oxides of iron from artificial gas plants, by weight, and calcining the mixture.

JOSEPH C. HECKMAN.